Feb. 16, 1965 J. G. LORD ETAL 3,169,698
LOCKING AND UNLOCKING SYSTEM FOR VOTING MACHINE AND THE LIKE
Filed July 16, 1963 6 Sheets-Sheet 1

INVENTORS.
JOHN G. LORD
BY RAYMOND ABRAMS
ATTORNEY.

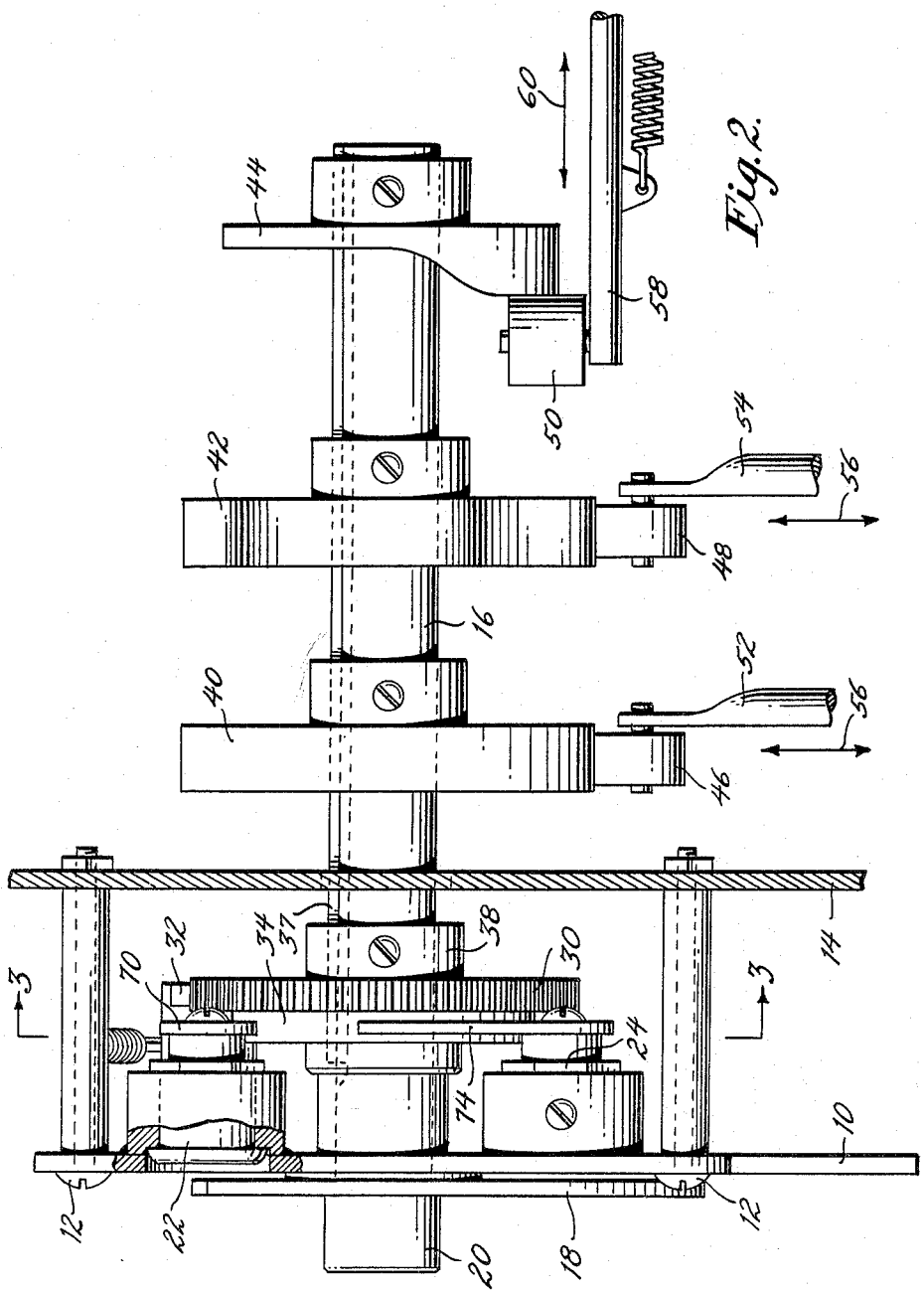

Feb. 16, 1965   J. G. LORD ETAL   3,169,698
LOCKING AND UNLOCKING SYSTEM FOR VOTING MACHINE AND THE LIKE
Filed July 16, 1963   6 Sheets-Sheet 3

INVENTORS.
JOHN G. LORD
BY RAYMOND ABRAMS
ATTORNEY.

Feb. 16, 1965        J. G. LORD ETAL        3,169,698
LOCKING AND UNLOCKING SYSTEM FOR VOTING MACHINE AND THE LIKE
Filed July 16, 1963        6 Sheets-Sheet 4
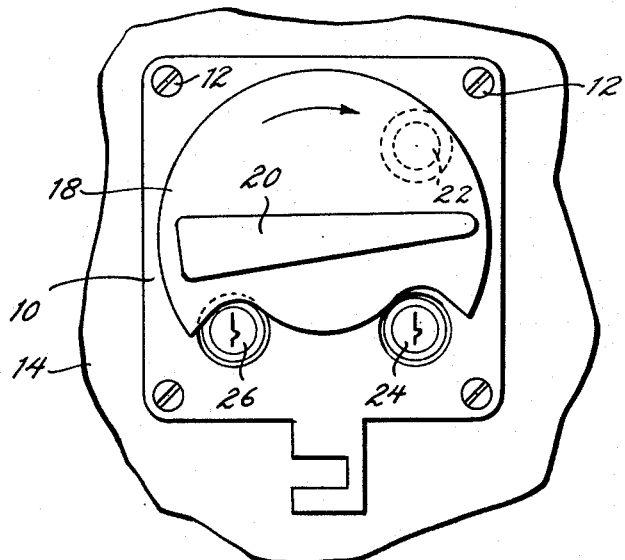
*Fig. 6.*
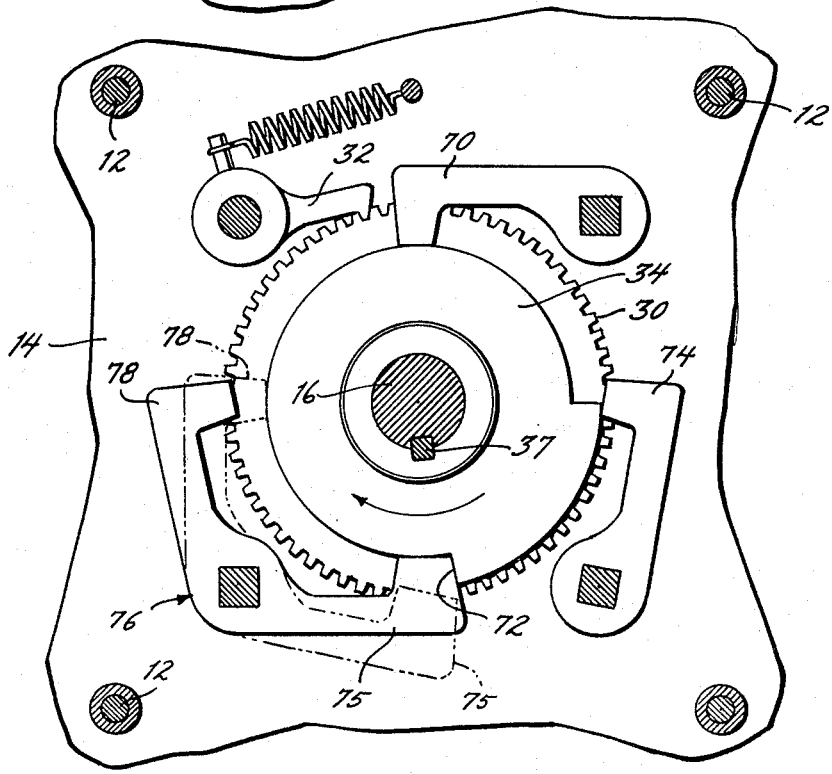
*Fig. 7.*
INVENTORS.
JOHN G. LORD
RAYMOND ABRAMS
BY
ATTORNEY.

Feb. 16, 1965  J. G. LORD ETAL  3,169,698
LOCKING AND UNLOCKING SYSTEM FOR VOTING MACHINE AND THE LIKE
Filed July 16, 1963  6 Sheets-Sheet 5

INVENTORS.
JOHN G. LORD
RAYMOND ABRAMS
BY
ATTORNEY.

Feb. 16, 1965     J. G. LORD ETAL     3,169,698
LOCKING AND UNLOCKING SYSTEM FOR VOTING MACHINE AND THE LIKE
Filed July 16, 1963                        6 Sheets-Sheet 6

INVENTORS.
JOHN G. LORD
RAYMOND ABRAMS
BY
ATTORNEY.

United States Patent Office 3,169,698
Patented Feb. 16, 1965

3,169,698
LOCKING AND UNLOCKING SYSTEM FOR VOTING MACHINE AND THE LIKE
John G. Lord, Swarthmore, and Raymond Abrams, Broomall, Pa., assignors to Shoup Voting Machine Corporation, New York, N.Y., a corporation of New York
Filed July 16, 1963, Ser. No. 295,330
7 Claims. (Cl. 235—51)

This invention relates to an improved locking system for voting machines.

Prior to an election, a voting machine is placed in operative condition, with all of its counters at zero, and it must be locked against tampering between the time it is so conditioned and the opening of the voting polls. Commonly, and particularly in the type of voting machine disclosed in Shoup Patent No. 2,054,102 and in the other Shoup patents, which are available in the U.S. Patent Office, the voting machine is provided with at least two locks, one lock being operated by a key in the sole possession of the person who stores and prepares the machines prior to each election, and is known as the "custodian," and the other lock being operated by a key in the sole possession of the person who supervises the election and who is commonly known as the election officer. The custodian lock and the election officer lock may, jointly, separately, or inter-dependently, immobilize, or release, one or more of the operative components of the machine to permit, or to prevent the use of the machine. For example, the custodian's lock could be so arranged that it can assume its locking position only after the vote counters have been re-set to zero and after the shutters which cover the vote counters and render them inaccessible are in their counter-covering position. Similarly, the election officer's lock can be so arranged as to immobilize the voting keys or handles and so that it can be moved to its locking position only if all voting handles are in their non-voting positions, and so on.

One object of this invention is to produce an improved locking system for a voting, or other, machine which must be dual-locked along the lines above set forth.

A further object is to produce an improved locking system which is compact, inexpensive and fool-proof.

The full nature of the invention will be understood from the following specification and the accompanying drawings in which:

FIG. 2 is an enlarged, side elevational view diagrammatically showing the application of my locking system to a Shoup voting machine.

FIGS. 4, 6, 8 and 10 are similar to FIG. 1, but showing different operative positions.

FIGS. 5, 7, 9 and 11 are similar to FIG. 3 but showing the parts in the positions of FIGS. 4, 6, 8 and 10, respectively.

Figure 1:
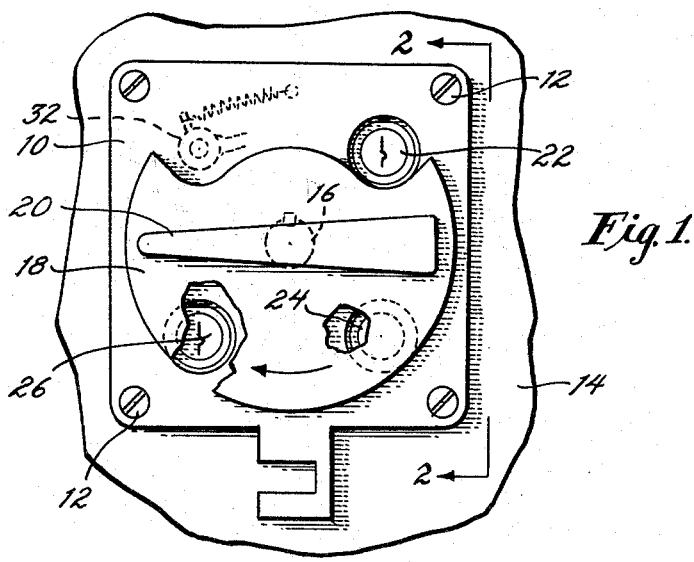
FIG. 1 is a front elevational view of a locking system embodying my invention.

In carrying out my invention, I take two or more conventional locks of a type in which the cylinder is turned by a key in one direction to lock, and in the opposite direction to unlock, and in which the key cannot be removed unless the cylinder of the lock is turned fully in locking or unlocking position. Locks of this type are available on the market and their structure and operation are shown in the 1963 catalogue of The Illinois Watch Co., copyright 1956, item 6418D. Therefore, the structure and operation of the locks, which, per se form no part of the present invention, are not shown or described.

As illustrated, 10 designates a mounting plate which is secured by screws 12 to a rigid support 14 which may be a part of the frame of a voting machine. Passing through mounting plate 10 and rotatable relative thereto is a shaft 16, to which is rigidly secured an index plate 18 which is turned by handle 20 to turn shaft 16. Mounting plate 10 is provided with three holes for receiving three locks 22, 24 and 26, the housings of which are rigidly secured to the mounting plate by welding, or otherwise. Since the locks form no part of the present invention, it is only necessary to assume that in the extreme counter-clockwise position of the locks, the key may be inserted and removed and that as soon as the cylinder is moved in clockwise direction, the key is "captured" in that it cannot be removed from the lock.

Figure 3:
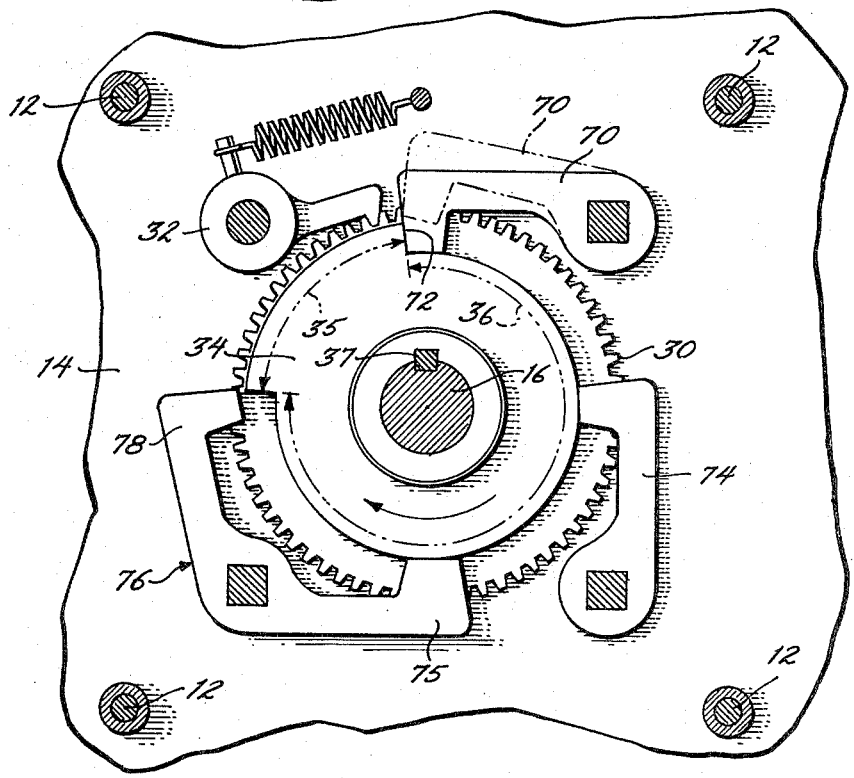
FIG. 3 is a sectional view looking in the direction of line 3—3 on FIG. 2.

Shaft 16 fixedly carries a gear 30 which is held against counter-clockwise direction, as viewed in the drawings, by a spring-loaded pawl 32 which is carried by support 14, FIG. 3. Gear 30 fixedly carries disc 34 which has a high surface portion which is coextensive with arrow 35 and a low surface portion which is coextensive with arrow 36. Gear 30 is keyed to shaft 16, as at 37, and it is fixed against movement longitudinally of shaft 16 by any suitable means, such as collar 38.

Shaft 16 also fixedly carries spaced cams 40, 42, 44, which, when shaft 16 is rotated, will actuate cam followers 46, 48 and 50 which are connected to machine operation controlling members 52, 54 and 58. For example, in one position thereof, control member 52 may immobilize the voting keys and in the other position thereof, it may release the keys and control member 54 can immobilize or release the vote counters, and so on. For versatility, cam followers 46 and 48 are arranged to reciprocate members 52 and 54 in a vertical direction, as shown by arrow 56, and cam follower 50 is arranged to reciprocate member 58 in a horizontal direction, or in the direction of arrow 60. Since the operation of the voting, or other, machine forms no part of this invention, it is not shown, nor described. For the purpose of this disclosure, it is enough to note that the movement of each of links 52, 54 and 58 to one position, or the other, performs, prevents or modifies the performance of some function or another in some machine or another. Also, while we have shown three control members 52, 54 and 58, a larger or smaller number may be used.

Figure 4:
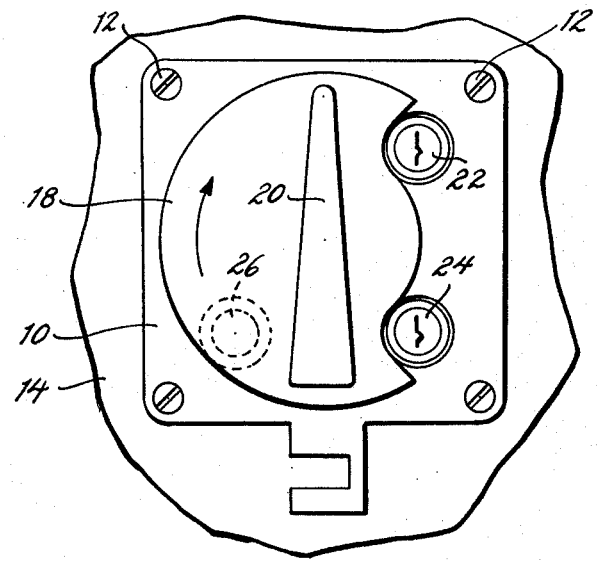
Figure 5:
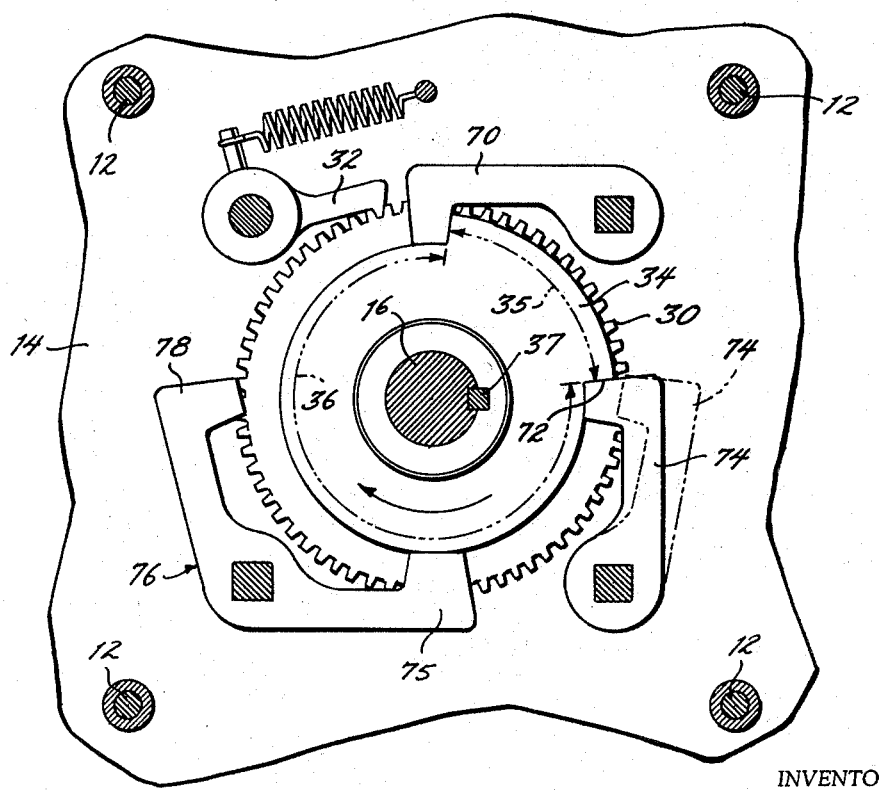
Figure 8:
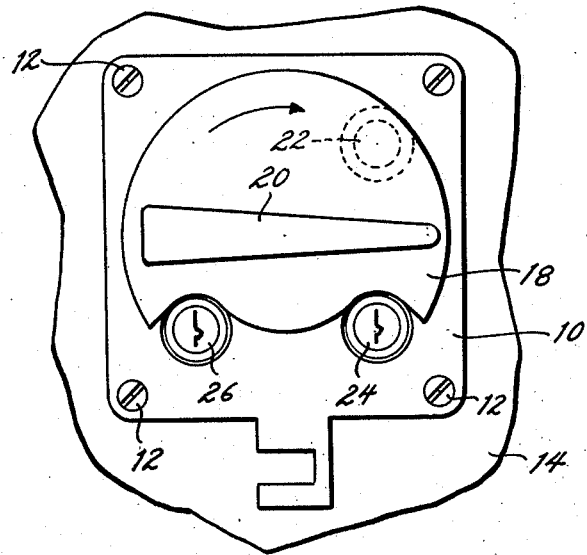
Figure 9:
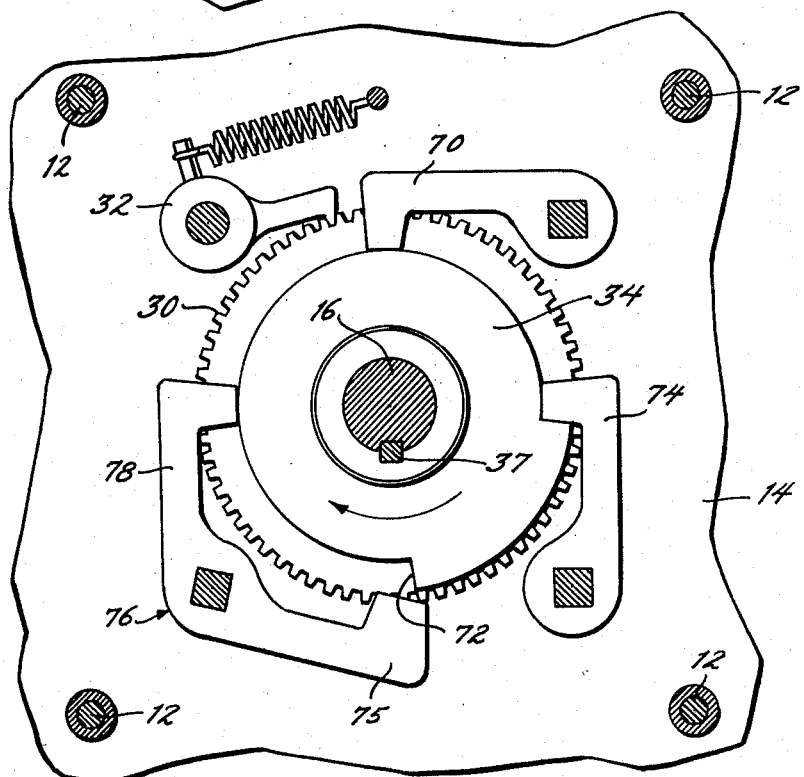
Figure 10:
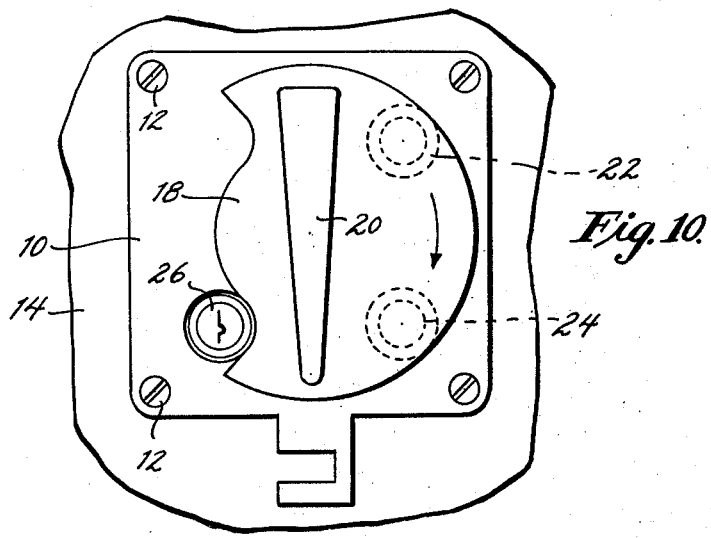
Figure 11:
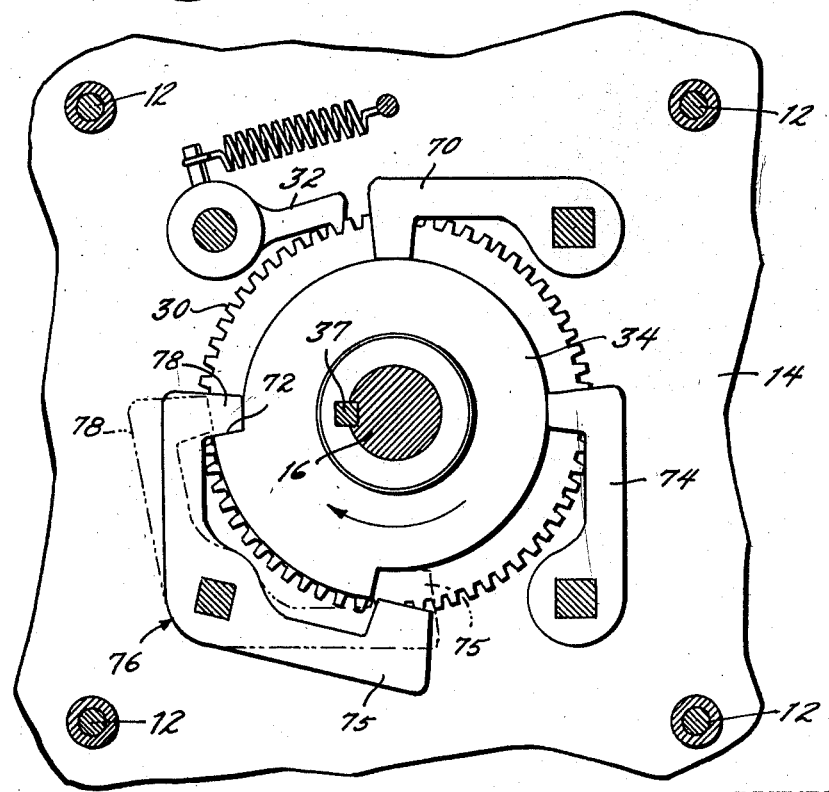

In order to subject the setting, locking and unlocking of the machine to the joint control of at least two persons, we provide a novel mechanism which is best shown in FIGS. 3, 5, 7, 9 and 11. As shown in these drawings, our invention includes a latch 70 which is rotatable with lock 22 and which, when riding on low surface portion 36 of disc 34, is adapted to abut the radial surface or edge 72 which separates high portion 35 of cam 34 from low portion 36, as shown in solid lines in FIG. 3, to prevent clockwise rotation of gear 30 and shaft 16. It will be noted that index plate 18 is mutilated so that, in the position of FIG. 3, it covers locks 24 and 26 and only lock 22 is accessible. To permit rotation of gear 30, the election officer uses his key to turn lock 22 in clockwise direction so as to lift latch 70 to the broken line position of FIG. 3, or out of engagement with leading edge 72 of high portion 35 of disc 34. Shaft 16 and gear 30 may now be turned until leading edge 72 abuts the end of latch 74 which is carried by lock 24 and which, in this position of the parts, rides on low portion 36 of disc 34, or in the parth of movement of leading edge 72. Latches 70 and 74 are so angularly related that, by the time leading edge 72 abuts latch 74, gear 30 will have been rotated through an angle of 90°, or to the position of FIG. 5. With the high portion 35 of disc 34 out of registration with latch 70, the election officer now turns lock 22 in counter-clockwise direction, or to the position of FIG. 5. This permits the election officer to pull his key out and to insert it in lock 24 which was exposed when index plate 18 moved from the position of FIG. 1 to the position of FIG. 4. The election officer now turns lock 24 in clockwise direction to take latch 74 out of the path of edge 72 to permit rotation of gear 30 and cam disc 34 to the position of FIG. 7. It will be noted that the length of arm 75 of double latch 76 is such that it abuts edge 72 before gear 30 and cam 34 have been rotated enough to take high portion 35 of disc 34 out of registration with the end of latch 74 which continues to ride on high surface 35. In this position of the parts, lock 24 cannot be moved in counter-clockwise direction and the key of the election officer cannot be withdrawn. But, rotation of gear 30 to the position of FIG. 7 moves index plate 18 to the position of FIG. 6 in which locks 24 and 26 are exposed. This enables the custodian, or other officer, to insert his key and turn lock 26 in clockwise direction to move latch arm 75 to the broken line position of FIG. 7, which is the solid line position of FIG. 9. Gear 30 may now be rotated to the position of FIG. 9, in which the high surface 35 of disc 34 is out of registration with latch 74. This permits rotation of lock 24 in counter-clockwise direction and withdrawal of the election officer's key from lock 24. It will be noted that movement of latch arm 75 in clockwise direction moves the arm 78 thereof in clockwise direction so that while arm 75 rides on high portion 35, arm 78 will ride on the low portion 36 of disc 34, FIG. 9. Gear 30 may now be rotated to the position of FIG. 11 in which leading edge 72 abuts latch 78. In this positon, index plate 18 covers locks 22 and 24 and only lock 26 is exposed. With the parts in this position, the custodian turns lock 26 in counter-clockwise direction to move latch arm 78 out of engagement with edge 72. This permits the custodian to withdraw his key and permits rotation of gear 30 back to the position of FIG. 3 and returns index plate 18 back to the positon of FIG. 1.

From the foregoing, it will be seen that the machine cannot be reset to start a new cycle unless the custodian's key is available; that, in the absence, or refusal, of the custodian to act, the election officer can only get his key captured; and that unless the election officer first operates locks 22 and 24, the custodian can have no access to lock 26. It will also be seen from the foregoing that this versatile invention is the utmost in simplicity because it only involves the application of conventional locks 22, 24, 26, disc 34, latches 70, 74 and 76 to the operating shaft of a voting, or other, machine with, or without, cams 46, 48 and cam followers 52, 54 and 58.

We claim:

1. A device for controlling the operation of a machine which comprises at least one member movable to a first position, or to a second position, to modify the operation of the machine.
   said device including,
   a rotary shaft,
   means operatively connecting said shaft to said member whereby a first partial rotation of said shaft moves said member to its first position and whereby a second partial rotation of said shaft moves said member to a second position,
   a fixed support,
   a lock carried by said support and having a cylinder rotatable to a first position and to a second position,
   means rotatable with, and operable in the first position of said cylinder to prevent rotation of said shaft,
   said means being operable in the second position of said cylinder to permit rotation of said shaft, and, a cover plate rotatable with said shaft and operable, in one position of said shaft, to obstruct said lock.

2. A device for controlling the operation of a machine which comprises at least one member movable to a first position in which the machine is locked against use and to a second position in which the machine is released for use,
   said device including,
   a rotary shaft,
   means operatively connecting said shaft to said member whereby a first partial rotation of said shaft moves said member to its first position and whereby a second partial rotation of said shaft moves said member to a second position,
   a gear carried by said shaft,
   a disc carried by said gear,
   first and second locks, each including a cylinder rotatable to a first or second position,
   a first latch rotatable with the cylinder of said first lock and operative in the first position of the cylinder to engage said disc to prevent rotation of said shaft and operative in the second position of said cylinder to permit rotation of said shaft, and
   a second latch rotatable with the cylinder of said second lock and operative in the first position of said cylinder to engage said disc to prevent rotation of said shaft and operative in the second position of said cylinder to permit rotating of said shaft.

3. The device defined in claim 2 and an index plate rotatable with said shaft and operable in a first position thereof to expose said first lock and to obstruct said second lock and operable in a second position thereof to expose both of said locks.

4. The device defined in claim 3 in which said index plate is rotatable to a third position in which it obstructs said first and said second locks.

5. Control means for use with a machine which includes a plurality of operating members, each movable between first and second positions, to modify the operation of the machine, said control means including
   a rotary shaft,
   cams carried by said shaft,
   cam followers carried by said operating members and selectively engageable with said cams to move the corresponding operating members to their first or second positions upon rotation of said shaft,
   a disc rotatable with said shaft and having a relatively high arcuate portion and a relatively low arcuate portion separated by a radial abutment edge,
   a fixed support adjacent said shaft,
   first, second and third locks carried by said support and arranged substantially triangularly about the axis of said shaft,
   said locks being key-rotated to first and second positions,
   each of said locks being of a type which accepts and releases its key in the first position thereof and retains its key in the second position thereof,
   first, second and third latches rotatable with said locks, respectively,
   each of said latches in the first position of its lock riding on said low portion and adapted to engage said abutment edge to prevent rotation of said shaft and to permit withdrawal of its key,
   each of said latches, in the second position of its lock, riding on said high portion to permit rotation of said shaft and to prevent withdrawal of its key, and
   an index plate rotatable with said shaft and operative, in a first position thereof, to expose said first lock only; and operative in a second position of said shaft to expose said first and second locks only; and operative in a third position thereof to expose said second and third locks only; and operative in a fourth position thereof to expose said third lock only,
   the distance between said first and second latches being equal to the length of said low portion whereby, when said high portion is between said first and second latches, both of said latches ride on said low portion, the distance between said second and third latches being less than the length of said high portion whereby, when the movement of said shaft has been arrested by engagement of said third latch with said abutment edge, said second latch will continue to ride on said high portion to prevent withdrawal of the key from said second lock until said third lock is moved to its second position, said first and second locks being identical and operated by a single key.

6. Control means for use with a machine which includes a plurality of operating members, each movable between first and second positions, to modify the operation of the machine, said control means including a rotary shaft, cams carried by said shaft, cam followers carried by said operating members and selectively engageable with said cams to move the corresponding operating members to their first or second positions upon rotation of said shaft, a disc rotatable with said shaft and having a relatively high arcuate portion and a relatively low arcuate portion separated by a radial abutment edge, a fixed support adjacent said shaft, first, second and third locks carried by said support and arranged substantially triangularly about the axis of said shaft, said locks being key-rotated to first and second positions, each of said locks being of a type which accepts and releases its key in the first position thereof and retains its key in the second position thereof, first and second latches rotatable with said first and second locks, respectively, each of said first and second latches in the first position of its lock riding on said low portion and adapted to engage said abutment edge to prevent rotation of said shaft and to permit withdrawal of its key, each of said latches, in the second position of its lock, riding on said high portion to permit rotation of said shaft and to prevent withdrawal of its key, a third latch rotatable with said third lock, and a fourth latch also rotatable with said third lock and disposed between said first and said third latch, said third latch, in said first position of said third lock, riding on said low portion to prevent rotation of said shaft and permit withdrawal of said key, in which position the fourth latch is out of engagement with said low portion, and said fourth latch, in the second position of said lock, riding on said low portion to prevent rotation of said shaft and withdrawal of the key, said third latch, in said second position of said lock, being out of engagement with said low portion.

7. Control means for use with a machine which includes a plurality of operating members, each movable between first and second positions, to modify the operation of the machine, said control means including a rotary shaft, cams carried by said shaft, cam followers carried by said operating members and selectively engageable with said cams to move the corresponding operating members to their first or second positions upon rotation of said shaft, a disc rotatable with said shaft and having a relatively high arcuate portion and a relatively low arcuate portion separated by a radial abutment edge, a fixed support adjacent said shaft, first, second and third locks carried by said support and arranged substantially triangularly about the axis of said shaft, said locks being key-rotated to first and second positions, each of said locks being of a type which accepts and releases its key in the first position thereof and retains its key in the second position thereof, first and second latches rotatable with said first and second locks, respectively, each of said first and second latches in the first position of its lock riding on said low portion and adapted to engage said abutment edge to prevent rotation of said shaft and to permit withdrawal of its key, each of said latches, in the second position of its lock, riding on said high portion to permit rotation of said shaft and to prevent withdrawal of its key, a third latch rotatable with said third lock, a fourth latch also rotatable with said third lock and disposed between said first and said third latch, said third latch, in said first position of said third lock, riding on said low portion to prevent rotation of said shaft and permit withdrawal of said key in which position the fourth latch is out of engagement with said low portion and said fourth latch, in the second position of said lock, riding on said low portion to prevent rotation of said shaft and withdrawal of the key, said third shaft, in said second position of said lock, being out of engagement with said low portion, and an index plate rotatable with said shaft and operative, in a first position thereof, to expose said first lock only; and operative in a second position of said shaft to expose said first and second locks only; and operative in a third position thereof to expose said second and third locks only; and operative in a fourth position thereof to expose said third lock only, the distance between said first and second latches being equal to the length of said low portion whereby, when said high portion is between said first and second latches, both of said latches ride on said low portion, the distance between said second and third latches being less than the length of said high portion, whereby, when the movement of said shaft has been arrested by engagement of said third latch with said abutment edge, said second latch will continue to ride on said high portion to prevent withdrawal of the key from said second lock until said third lock is moved to its second position, said first and second locks being identical and operated by a single key.

References Cited by the Examiner

UNITED STATES PATENTS

| 2,162,605 | 6/39 | Coil | 235—130 |
| 2,216,458 | 10/40 | Shoup | 235—55 |
| 2,834,195 | 5/58 | Stockhouse | 70—339 |
| 2,868,007 | 1/59 | Neiman et al. | 70—185 X |

LEO SMILOW, *Primary Examiner.*